US 8,810,820 B2

United States Patent
Withington et al.

(10) Patent No.: US 8,810,820 B2
(45) Date of Patent: Aug. 19, 2014

(54) ACTIVE PRINTING SYSTEM AND METHOD FOR PRINTING BASED ON IMAGE SIZE

(71) Applicant: System Development Inc., Houston, TX (US)

(72) Inventors: D. Keith Withington, Houston, TX (US); Reese W. Murdock, Houston, TX (US)

(73) Assignee: System Development, Inc., Houston, TX (US)

( * ) Notice: Subject to any disclaimer, the term of this patent is extended or adjusted under 35 U.S.C. 154(b) by 0 days.

(21) Appl. No.: 13/719,512

(22) Filed: Dec. 19, 2012

(65) Prior Publication Data
US 2013/0107305 A1 May 2, 2013

Related U.S. Application Data

(63) Continuation of application No. 12/425,632, filed on Apr. 17, 2009, now Pat. No. 8,363,237.

(51) Int. Cl.
*G06F 3/12* (2006.01)
(52) U.S. Cl.
USPC ........ 358/1.13; 358/1.14; 358/1.18; 358/452; 358/449; 399/8; 399/86

(58) Field of Classification Search
CPC .... B41J 15/042; G06F 3/1208; G06F 3/1256; G06F 3/1255; G06F 3/1207
USPC ................................. 358/1.2, 1.13, 1.15, 1.18
See application file for complete search history.

(56) References Cited

U.S. PATENT DOCUMENTS

| 5,745,659 A | * | 4/1998 | Rigau Rigau et al. | 358/1.2 |
| 8,098,398 B2 | * | 1/2012 | Takasaki et al. | 358/1.2 |
| 2009/0059289 A1 | * | 3/2009 | Shintoku et al. | 358/1.15 |

* cited by examiner

*Primary Examiner* — Dennis Dicker
(74) *Attorney, Agent, or Firm* — Conley Rose, P.C.

(57) ABSTRACT

A system and method for printing an image on a medium whose dimensions are determined based on the size of the image are disclosed herein. A system includes a processor and a printing software system including an—Active Printing System ("APS") configured to execute on the processor. The APS receives from an application program invoking the APS a size of an image to be printed and returns to the application program a set of dimensions within which the image is to be printed on a selected print media. The set of dimensions is determined based, at least in part, on the size of the image.

20 Claims, 5 Drawing Sheets

ACTIVE PRINTING SYSTEM AND METHOD FOR PRINTING BASED ON IMAGE SIZE

CROSS-REFERENCE TO RELATED APPLICATIONS

This application is a continuation under 35 U.S.C. §120 of pending U.S. patent application Ser. No. 12/425,632, filed Apr. 17, 2009, entitled "Active Printing System and Method for Printing Based on Image Size," the disclosure of which is hereby incorporated herein by reference in its entirety.

BACKGROUND

A computer print architecture is intended to provide reliable and flexible connection of printing and plotting devices to a computer system. In seeking to accomplish this objective, print architectures have been developed that provide support for the most widely used printing devices and capabilities.

In the context of the Windows operating system print architecture, an application program initiates a printing operation by invoking a Common Property Sheet User Interface ("CPSUI"). The CPSUI enumerates the various printers installed on the system, presents application-defined settings, and displays printer specific settings retrieved from the Printer Driver User Interface. When a printer and printing options have been selected and the "PRINT" button is pressed, the CPSUI returns to the application a device context based on the selected printer. The application produces a print, in accordance with the device context, via, for example, a User Mode Graphics Device Interface ("GDI") Client. The GDI Client invokes a GDI Render Engine, which in conjunction with a Printer Driver corresponding to the selected printer, converts GDI calls to printer specific RAW data (e.g., printer control language ("PCL")). The RAW data is passed to a Port Monitor, a Kernel Mode Port Driver, and on to the printer.

The conventional Windows printing architecture adequately supports most common printing tasks. However, the architecture imposes various limitations that make specialized printing tasks unduly difficult. For example, the conventional printing architecture provides inadequate support for printers capable of producing prints of indefinite length.

SUMMARY

Various systems and methods for printing and/or plotting an image on a medium whose dimensions are determined based on the size of the image to be printed, and not solely on the selected media size, are disclosed herein. In accordance with at least some embodiments, a system includes a processor and a printing software system including an Active Printing System ("APS") configured to execute on the processor. The APS provides a display of capabilities of a printing device. The capabilities displayed include capability information reported by a printer driver corresponding to the printing device and a continuous feed media size supported by the printing device.

In accordance with at least some other embodiments, a method includes generating a display, via a processor. The display includes a set of printing device capabilities. The printing device capabilities include capability information provided by a printer driver corresponding to a printer and a continuous feed media size supported by the printing device. The display is provided to a display device for presentation to a user.

In accordance with at least some other embodiments, computer-readable medium encoded with a computer program includes instructions that when executed cause a processor to generate a display that includes a set of printing device capabilities. The printing device capabilities include capability information provided by a printer driver corresponding to a printing device and a continuous feed media size supported by the printing device. The program further includes instructions that when executed cause a processor to provide the display to a display device for presentation to a user.

In accordance with at least some other embodiments, a system includes a processor and a printing software system including an Active Printing System ("APS") configured to execute on the processor. The APS receives from an application program invoking the APS a size of an image to be printed, and returns to the application program a set of dimensions within which the image is to be printed on a selected print media. The set of dimensions is determined based, at least in part, on the size of the image.

In accordance with at least some other embodiments, a method includes determining, in an application program running on a processor, a size of an image to be printed by the application program. The size of the image is provided to an Active Printing System ("APS") included in a printing software system running on the processor. The APS determines a set of dimensions that constrain the image when printed. The set of dimensions is based, at least in part, on the size of the image. The set of dimensions is provided to the application program. An image file is generated by the application program based, at least in part, on the set of dimensions.

In accordance with at least some other embodiments, a computer-readable medium encoded with a computer program includes instructions that when executed cause a processor to receive a size of an image to be printed. The size is provided by an application program that generates the image. The program includes instructions that cause a processor to determine a set of dimensions that constrain the image when printed. The set of dimensions is based on the size of the image. The program includes additional instructions that cause a processor to provide the set of dimensions to the application program. The application program is configured to generate an image file based, at least in part on the set of dimensions.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
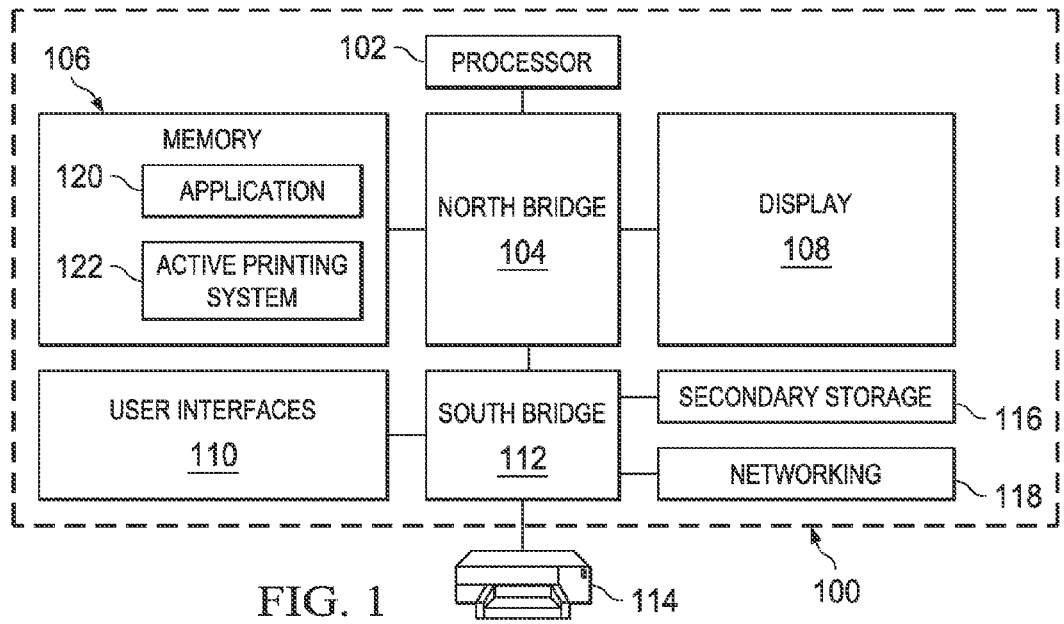
FIG. 1 shows a computer system including an Active Printing System ("APS") architecture in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to. . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "software" includes any executable code capable of running on a processor, regardless of the media used to store the software. Thus, code stored in memory (e.g., non-volatile memory), and sometimes referred to as "embedded firmware," is included within the definition of software.

The term "continuous feed medium/media" is intended to mean any medium of indefinite or extended length, perforated or unperforated, onto which a printing and/or plotting device can affix an image and the printed media thereafter detached from the conjoined blank media. Examples of continuous feed media include paper or other substrate materials supplied in roll form, as fanfold sheets, etc. onto which characters and/or images can be printed. Continuous media may be referred to by various names, for example, banner media, roll media, fanfold media, continuous form media, web media, etc.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Conventional print architectures, for example, the Windows print architecture, are designed to employ various fixed media sizes. The media sizes supported are generally defined by way of a Printer Driver uniquely associated with a particular printing device. The supported media sizes are selectable via the Common Property Sheet User Interface ("CPSUI") displayed when a print operation is initiated. Some Printer Drivers may support few media sizes (e.g., letter, legal, A4), and other Printer Drivers may support numerous media sizes. To allow for support of non-standard media sizes, some Printer drivers include a custom media size selection that can be used to define and add an otherwise unsupported media size to those selectable by the user.

Some printers are capable of using continuous feed media and producing prints of varying length. Such printers are widely used in the energy industry and in other applications that require large hard copies. Selection of fixed size media, including custom media sizes, generally provides an inadequate solution for such printing applications because print lengths may change often, requiring changed custom media definitions or waste of media, an operator may not know the size of a print to be produced, or print architecture constraints may make a print of the required size impossible to obtain.

Embodiments of the present disclosure overcome the deficiencies of conventional print architectures to provide convenient and flexible operation of printing devices that use continuous feed or other media capable of varying length. Embodiments replace various components of a conventional print architecture, and add new components to provide an improved print architecture that overcomes the deficiencies of the conventional architecture. In particular, embodiments of the present disclosure provide variable print lengths without requiring operator selection of a media length. In providing such variable print lengths, embodiments dynamically determine a media size appropriate to accommodate an image to be printed, rather than utilizing a predefined media size. Accordingly, an embodiment can be referred to as an Active Printing System.

FIG. 1 shows in computer system 100 including an Active Printing System ("APS") architecture 122 in accordance with various embodiments. The system 100 comprises a processor 102, a north bridge 104, and a south bridge 112. Various embodiments may implement north and south bridges 104, 112 as separate components or as a single component. The processor 102 is coupled to the north bridge 104 via a high-speed bus, sometimes referred to as a front side bus. The north bridge 104 couples the processor 102 to higher speed devices, while the south bridge 112 couples the processor 102 to lower speed devices.

The system 100 also comprises memory 106, typically Dynamic Random Access Memory ("DRAM"); however, Static Random Access Memory ("SRAM"), or other suitable random access memory technology may also be used. The memory 106 is coupled to the north bridge 104 via a bus configured to access the memory 106.

Display 108 provides visual information to a user. A Liquid Crystal Display, Cathode Ray Tube display, plasma display, Organic Light Emitting Diode display, electro-luminescent display, projection display, or other display technology used to display text and/or graphics for a user may be employed. In some embodiments, a display adapter may be integrated into the north bridge 104. In other embodiments, a display adapter may be coupled to the north bridge 104 via a high-speed bus (e.g., Peripheral Component Interface ("PCI"), PCI Express ("PCIe"), Accelerated Graphics Port, etc.).

Secondary Storage 116 provides storage for program and data elements. Secondary Storage 116 typically comprises a hard drive, but more generally may comprise a FLASH drive or any other non-volatile storage device. The Secondary Storage 116 may be coupled to the remainder of the system 100 by any of a variety of interfaces (e.g., Serial or Parallel Advanced Technology Attachment, Small Computer Systems Interface, Universal Serial Bus ("USB"), Fiber Channel, etc.).

The User Interfaces 110 include various human interface components. Such as, for example, audio input or output interfaces, video camera interfaces, control interfaces (e.g., keyboard, mouse, touchpad, touchscreen, etc.). A particular User Interface 110 may be coupled to the south bridge 112 by a specific purpose bus (e.g. audio), or by general-purpose bus (e.g., USB).

Networking components 118 can include wired or wireless network adapters. For example, a network adapter can be configured to operate in an IEEE 802.11 compliant wireless local area network, or to operate in an IEEE 802.3 wired Ethernet network, or any other wired or wireless network. The networking components 118 can be coupled to the south bridge 116 via a bus, for example PCI or PCIe.

A printer 114 may be coupled to the computer system 110 via the south bridge 112. The printer 114 can be any printing or plotting device capable of producing human viewable text or graphics on a print medium. Such devices include, for example, a laser printer, a thermal printer, an ink-jet printer, etc. Embodiments of the printer 114 include printing devices configured to use fixed sheet sizes, wide/narrow media, and/or continuous feed media.

The memory 106 can store an application program 120 and an Active Printing System ("APS") 122. The application program 120 can be any program executable by the processor 102 that allows a user of the computer 100 to print an output on the printer 114. In at least some embodiments, the application program 120 may print to file rather than the printer 114. Exemplary application programs 120 include data processing programs, publishing programs, data viewing programs, etc., that produce graphical and/or textual output.

The application program 120 and/or the APS 122 programming can be stored in any computer readable medium for access and execution by the processor 102. Exemplary computer readable media include semiconductor memory (e.g., random access memory ("RAM"), read only memory ("ROM"), FLASH memory, etc.), magnetic storage (e.g., disk drives, floppies, etc.), optical storage (e.g., compact disks ("CD"), digital versatile disk ("DVD"), etc.), or any other tangible device capable of storing software programming.

When the application program 120 is directed by a user to provide a print, e.g., a hard copy or a print file, the application program 120 invokes the APS 122. The APS 122 is capable of producing variable length print output to the printer 114 and/or to a file without operator control as to media length. Moreover, the APS 122 advantageously provides orientation and scaling options, selection of printer 114 supported continuous feed media, preview of continuous feed printing, and various other advantages over conventional print architectures.

Figure 2:
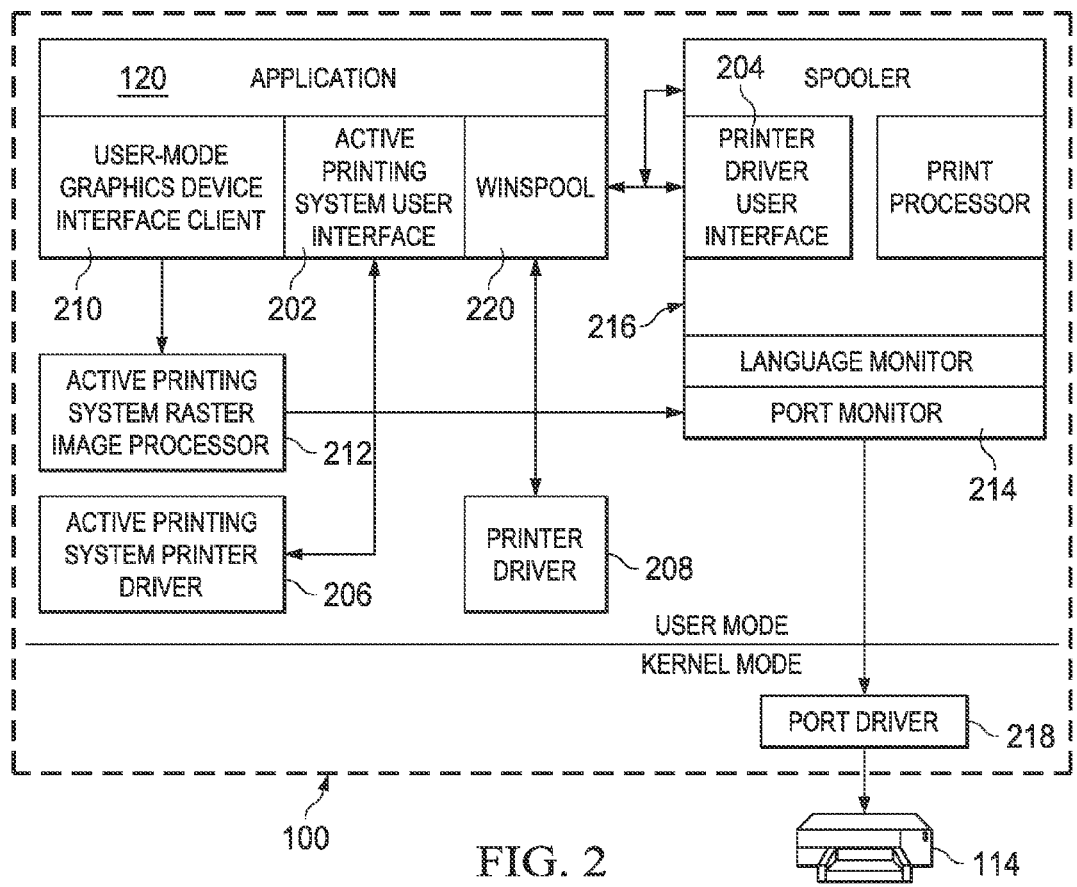
FIG. 2 shows an APS architecture and exemplary interconnections between APS modules in accordance with various embodiments.

FIG. 2 shows an APS architecture and exemplary interconnections between APS modules in accordance with various embodiments. The application 120 and the APS architecture can be executed on the computer 100. A user of the application program 120 may desire to produce a hard-copy output on the printer 114. The printer 114 is capable of printing to continuous feed media and/or selected sheet sizes. The printing process is initiated by invoking the APS through, for example, a printing icon, pull-down menu, or other selection means provided by the application program 120. When invoked, the APS, through the APS User Interface module ("APS UI") 202 provides a display for the user that shows installed printers and provides access to user selectable printer options. The APS UI 202 can also provide access to printer 114 specific settings supplied via the Printer Driver UI 204.

Because the printer 114 is capable of printing on continuous feed media, the APS UI 202, in addition to displaying the standard page sizes supported by the printer, also displays the various continuous feed media sizes supported by the APS for the printer 114. Each supported continuous feed media size is preferably identified by the width of the continuous feed media. The APS UI 202 also provides a preview showing the appearance of the image to be printed on the selected sheet or continuous feed media, and allows for proportional or individual (isotropic or anisotropic) scaling of the image height and width.

The APS does not require selection of fixed length print media when using a printer 114 with continuous feed media. Instead, when the application program 120 invokes the APS UI 202, the application program provides to the APS UI 202 the dimensions of the image to be printed. Using the provided image dimensions, in conjunction with various selected printing parameters, e.g., resolution, scaling and/or orientation parameters, the APS determines a virtual page size (i.e., length and width) required to print the image. When using continuous feed media, the physical media width is fixed in accordance with the selected continuous feed width, but the physical media length is determined based on the virtual media length. Thus, the APS provides variable length print output that avoids wasted media, and does not require definition of a custom sheet for each print length.

When the user is satisfied with the selected printing options, the user performs an action (e.g., clicks an OK button on the APS UI 202 display) that causes the APS UI 202 to provide the application program 120 with a set of printing parameters (i.e., a virtual device context) based on the virtual page size, selected printer, and selected printing options. At least some of the parameters provided in the virtual device context are derived from an APS Printer Driver 206. In particular, the APS UI 202 invokes the APS Printer Driver 206 to determine the dimensions of a virtual page corresponding to the image to be printed.

In some embodiments, the APS UI 202 creates the virtual device context as follows. The spooler client interface (e.g., Winspool 220) in conjunction with the Printer Driver UI 204 and the printer 114 specific Printer Driver 208, create and provide to the APS UI 202 a data structure ("DEVMODE" structure) detailing the capabilities of the printer 114. The APS UI 202 invokes the APS Printer Driver 206 and passes to the Driver 206 the DEVMODE structure defining printer 114 capabilities. The APS UI 202 also passes to the APS Printer Driver 206 the size of the image to be printed as provided by the application program 120, user selected parameters indicative of scaling and orientation, and a request for the Driver 206 to provide a virtual page size and print resolution for the image. The APS Printer Driver 206 determines the dimensions of the virtual page based on the size of the image to be printed, user selected orientation, height, and width scale factors, selected print resolution, and other parameters. Print parameters generated by the APS Printer driver 206 are preferably merged into the DEVMODE structure and returned to the APS UI 202. The APS UI 202 can create a printer device context (i.e., a virtual device context) to be returned to the application program 120 based on the merged DEVMODE structure. In at least some embodiments, the virtual device context provided to the application program 120 causes the application program 120 to produce a metafile (i.e., a vector graphics format file, such as an enhanced metafile ("EMF"), XML Paper Specification ("XPS") file, etc.) rather than a RAW device specific data file.

The application program 120 receives the virtual device context provided by the APS UI 202 and in some embodiments, uses the User-Mode Graphics Device Interface ("GDI") Client to draw the image (e.g., an EMF) in accordance with the virtual device context. Some embodiments may use XPS or yet another drawing system to draw the image. Embodiments of the present disclosure are not limited to any particular drawing system or image file format. The image is drawn in accordance with the virtual page size provided as part of the virtual device context. The application 120 can call delimiting routines (e.g., SDI_StartDoc, SDI_StartPage, SDI_EndPage, SDI_EndDoc) to define the document and its pages. When the application 120 completes the image file, SDI_EndDoc may be called to close the metafile.

The metafile is provided to the APS Raster Image Processor ("RIP") for conversion to printer specific language (e.g., RAW data). If the virtual page size on which the metafile is based is larger than the physical page selected for use by the printer 114, the APS RIP 212 can subdivide the image drawn on the virtual page into a plurality of images each to be printed on different physical pages and combined after printing. Thus, APS supports printing of images that exceed the size of a selected print media. The APS RIP output is provided to the Port Monitor 214 in the print spooler 216. The Port Monitor 214 delivers the RAW data to the Kernel Mode Port Driver 218 which provides the RAW data to the printer 114.

In some embodiments the APS UI 202 replaces the CPSUI used in other print architectures. The APS architecture may be invoked by calling a print software function (e.g., sdi_print( )) that may be provided in, for example, a dynamic link library along with other APS software modules. When the application program 120 calls the print software function, the application program 120 may pass a data structure to the print function. The data structure can define various print properties that the application program 120 wishes to appear on a user interface display, and can also provide the size of the image to be printed. Additionally, the structure can include a reference to the DEVMODE structure. The DEVMODE structure can be used to create the virtual device context used by the application program 120 to draw the image to be printed as explained above.

Figure 3:
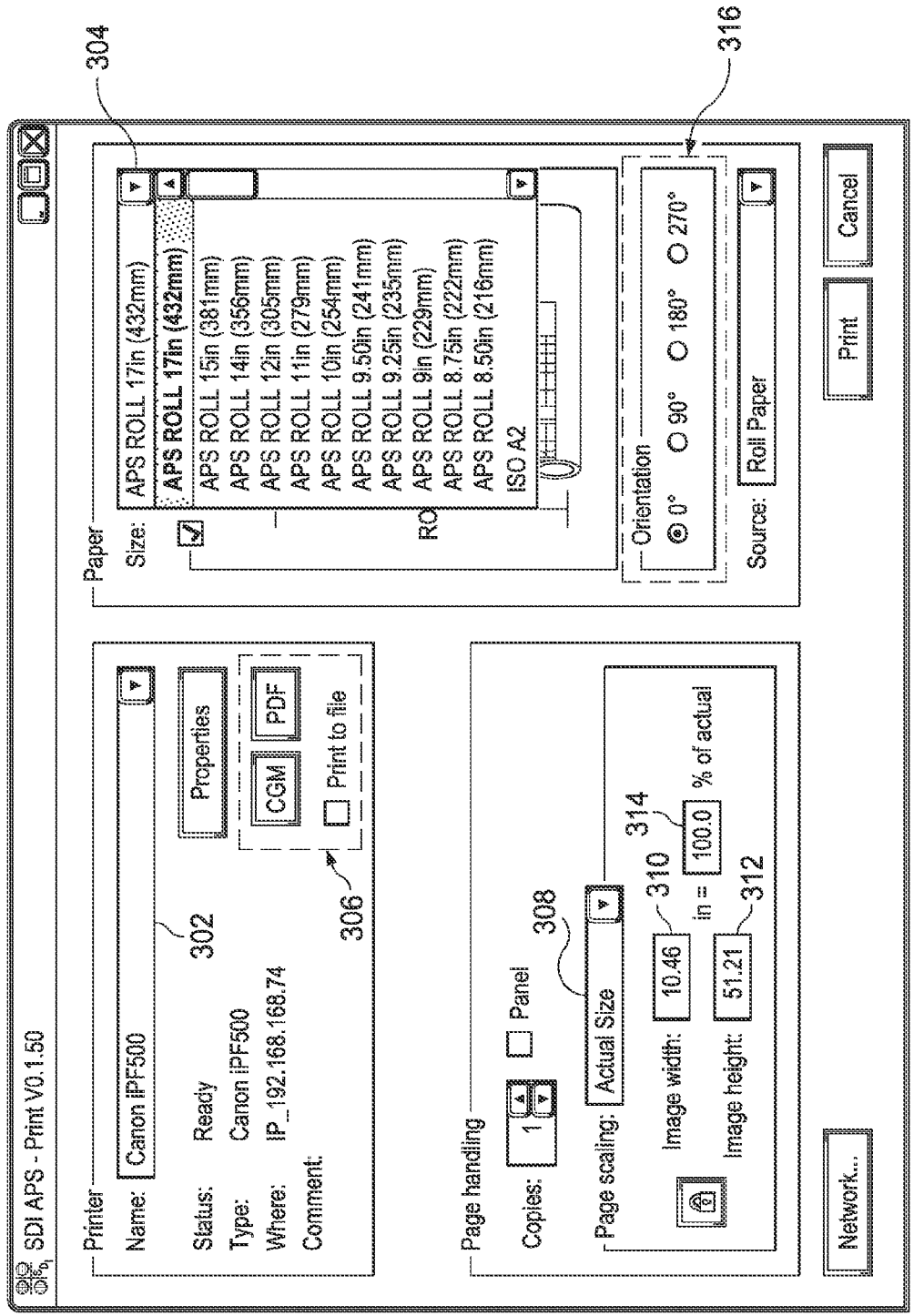
FIG. 3 shows an exemplary depiction of an APS User Interface ("UI") display in accordance with various embodiments.

FIG. 3 shows an exemplary depiction of an APS UI 202 dialog display in accordance with various embodiments. The display provides a printer selection field 302 that allows a user to select a printing device from a list of printers installed on the computer system 100. In the example of FIG. 3, a printer supporting continuous feed media has been selected. Consequently, the display includes in a list of selectable media sizes 304, at least some, and preferably all continuous feed media sizes supported by the selected printer. The continuous feed media sizes displayed are not provided by the printer 114 specific printer driver 208 or the Printer Driver UI 204, but rather are supplied by the APS UI 202.

The APS architecture supports printing to a file rather than to hard copy. Accordingly, the dialog includes selections 306 allowing a user to select printing to a device specific file for the selected printer or, to select whether the file is printed in Portable Document Format ("PDF") or Computer Graphics Metafile ("CGM") format. Additionally, controls may be provided to print to other specific formats. Similar to hard copy printing as exemplified above, when printing to a file, the APS architecture is not restricted to a fixed page size, but rather can print to a virtual page based on the size of the image to be printed.

The APS architecture supports individual scaling of image width and/or length. A menu 308 allows, for example, scaling to actual size, scaling of width only, scaling of height (i.e., length) only, individual scaling of both width and height, or ratiometric scaling. In accordance with these options, image width 310, image height 312, and percentage 314 entry fields are provided. Allowing individual scaling of width and length is advantageous because it may be important that one parameter (e.g., length) comply with a preselected scale while the other parameter (e.g., width) is not so restricted. For example, if image width exceeds the media width, and if image width is not restricted, then the print width scaling can be changed to allow the image to be printed on a single sheet, thus saving media while maintaining a desired length scaling.

The orientation of a printed image can be selected via the buttons 316. In some embodiments, changing the orientation of an image with regard to print media results can change the image width 310 and image height 312 parameters. For example, selecting a 90-degree orientation may interchange the image width and image height parameters. Embodiments of the present disclosure allow selection of image scaling and/or orientation irrespective of the selected physical media. Thus, scaling and/or orientation may be applied when any of continuous feed media, fixed size sheets, or printing to a file are selected.

Figure 4:
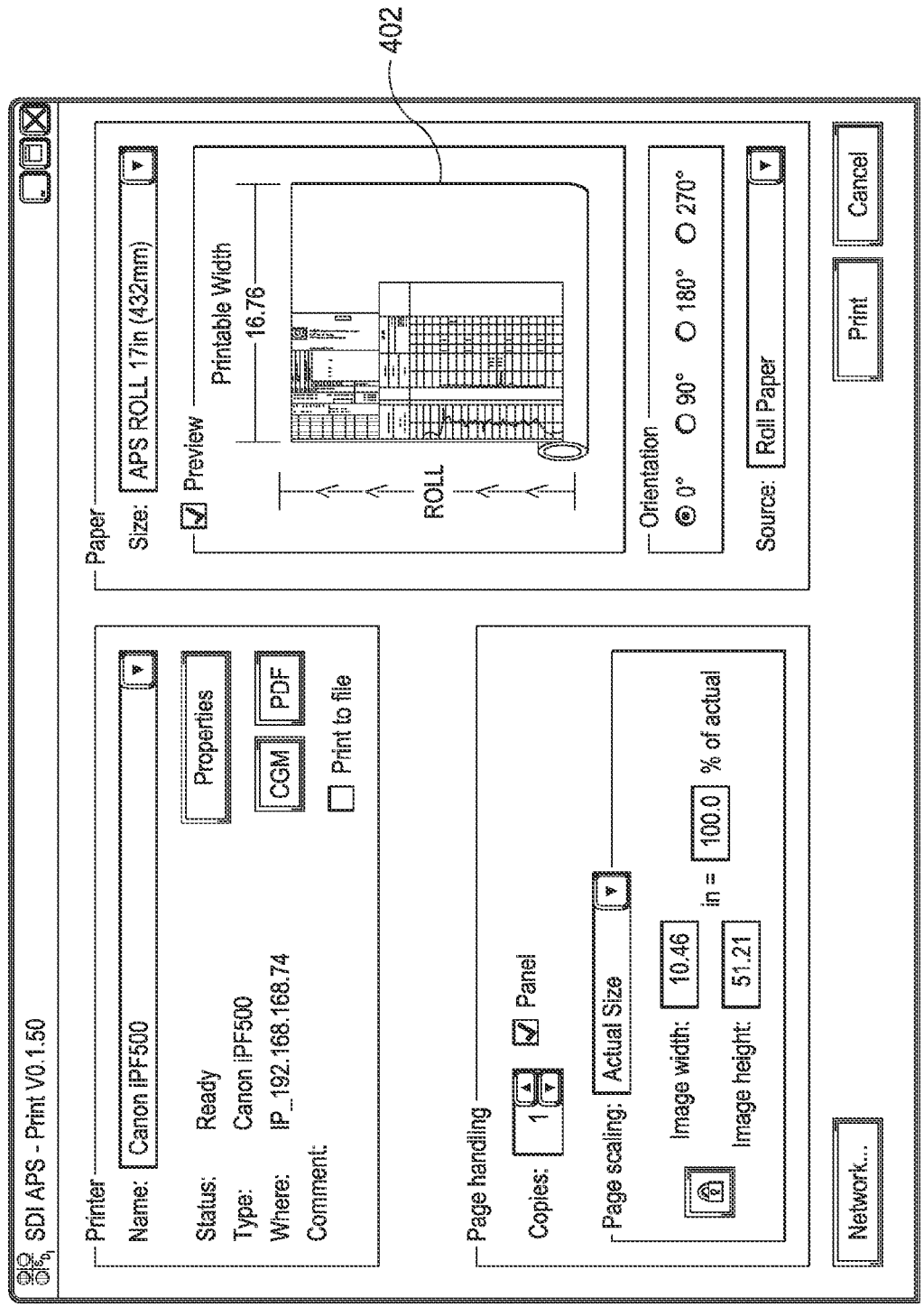
FIG. 4 shows an exemplary depiction of an APS UI dialog display including a continuous feed media print preview in accordance with various embodiments.

FIG. 4 shows an exemplary depiction of an APS UI 202 dialog display including a continuous feed media print preview 402 in accordance with various embodiments. The continuous feed media print preview 402 allows a user to see an image to be printed as the image will appear on a selected continuous feed media when a selected width and length scaling is applied. The preview is provided by having the application program 120 render the image in accordance with the selected continuous feed media size and scaling parameters. The preview 402 advantageously allows a user to determine whether print parameters, such as scaling, are properly set without wasting expensive consumables (e.g., ink, media, etc.). While the example of FIG. 4 shows a preview 402 of an image on continuous feed media, embodiments provide a print preview for any selected print media. Thus, embodiments can provide a preview with respect to continuous feed media, fixed size sheets, or printing to a file.

Figure 5:
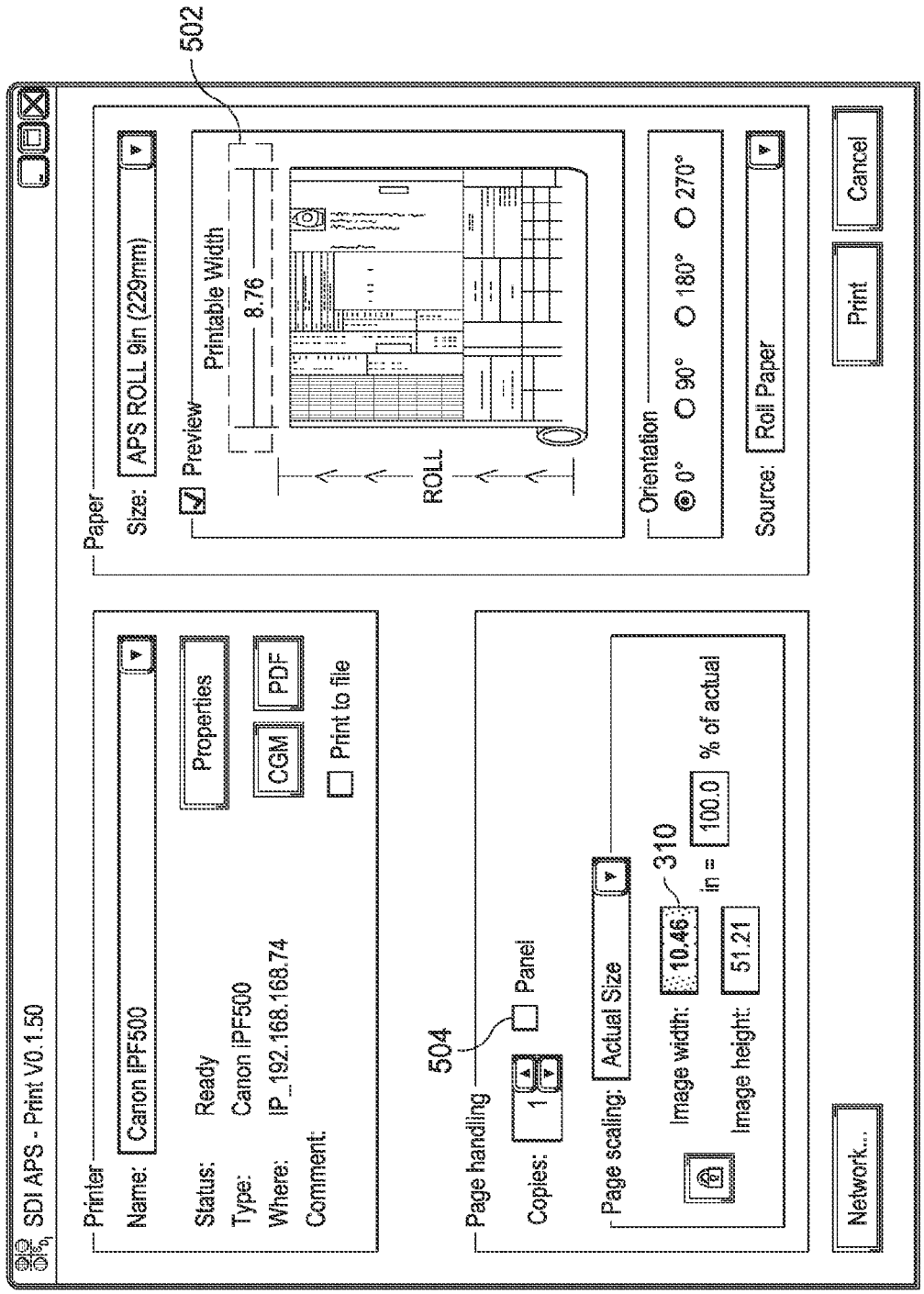
FIG. 5 shows an exemplary depiction of an APS UI dialog display including a continuous feed media print preview 502 of an image that exceeds a selected media size in accordance with various embodiments.

FIG. 5 shows an exemplary depiction of an APS UI 202 dialog display including a continuous feed media print preview 502 of an image that exceeds the selected sheet size in accordance with various embodiments. In the example of FIG. 5, a selected continuous feed media width is too narrow to accommodate the image to be printed when scaled in accordance with the displayed (i.e., selected) scaling selections. Under these conditions, embodiments of the APS UI 202 warn the user of the scaling problem. Some embodiments, may warn the user by changing the color of the problematic image parameter. For example, the Image width field 310 and/or the continuous feed media printable width 502 may be rendered in a selected warning color (e.g., red) to highlight the excessive image dimension. Note that the inclusion of margins make the printable width of the media (8.76 in.) less than the actual media width (9 in.). Exceeding a printable media parameter (e.g., printable width) triggers the oversize warning. As explained above, the user may adjust width scaling without effecting length scaling to correct this problem. Alternatively, the panel control 504 (e.g., checkbox) may be used to cause the APS UI 202 to print the image across multiple sheets or successive panels on a continuous feed media device, in which case an indication of the overlarge dimension can be provided, as explained above, by rendering the dimension in a selected warning color. As a matter of convenience, image width has been used to explain the dimension warning indicators, the ATS UI 202 includes similar warning indicators for image length. While the example of FIG. 5 depicts oversize warnings with respect to an image on continuous feed media, embodiments provide oversize warnings for any selected print media. Thus, embodiments can provide oversize warnings with respect to continuous feed media or fixed size sheets.

Figure 6:
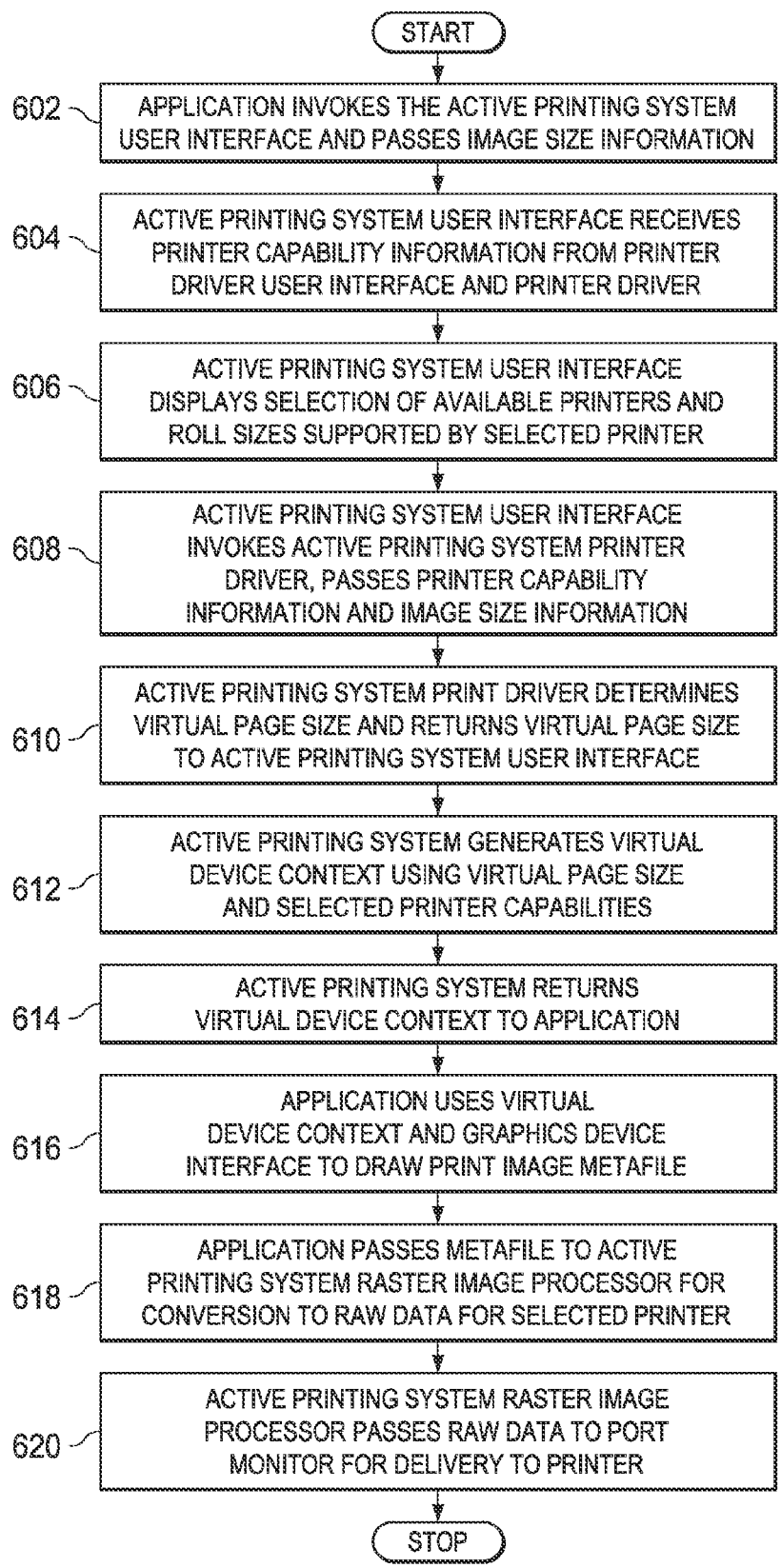
FIG. 6 shows a flow diagram for a method for providing a print output using an APS architecture in accordance with various embodiments.

FIG. 6 shows a flow diagram for a method for providing a print output in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method can be encoded in instructions provided to a processor as software programming stored in a computer readable medium.

In block 602, the application program 120 running in the computer 100 is ready to print an output. Generally, this occurs when a user of the computer 100 elects to perform a printing operation, but may occur for other reasons as well. The application program 120 invokes the APS UI 202 and passes to the APS UI 202 information regarding print parameters that should be displayed for the user, and information defining the size of the image to be printed.

In block 604, the APS UI 202 receives printer capability information derived from the Printer Driver UI 204 and the printer 114 specific Printer Driver 208. The capability information may include, for example, print qualities, color modes, etc. supported by the selected printer 114.

In block 606, the APS UI 202 displays a list of installed printers, printing options, the sizes of media (including continuous feed media and fixed sized media) supported, and other capabilities of a selected printer 114. The displayed dialog allows the user to independently select width and length scaling for the image to be printed and to view a preview of the image printed on the selected media, including continuous feed media.

In block 608, after the user has selected printing parameters, the APS UI 202 invokes the APS Printer Driver 206, and passes printer 114 capability information, selected print parameters, and image size information to the APS Printer Driver 206. The APS UI 202 requests the APS Printer Driver 206 determine a virtual page size based on the image size and selected printer 114 capabilities and parameters (e.g., print resolution, selected media, etc.).

In block 610, the APS Printer Driver 206 determines a virtual page size for the image to be printed and returns the virtual page size to the APS UI 202. The APS Printer Driver 206 determines the virtual page size based on the size of the image to be printed and selected printer 114 parameters and capabilities. In some embodiments, the virtual page size may be merged into a data structure (i.e., DEVMODE) containing the printer capabilities passed to the APS Printer Driver 206.

In block 612, the APS UI 202 generates a virtual device context that includes the virtual page size provided by the APS Printer Driver 206, the printer 114 capabilities provided by the Printer Driver UI 204 and the printer 114 specific Printer Driver 208, and user selected parameters provided by the APS UI 202.

In block 614, the APS UI 202 provides the virtual device context to the application program 120.

In block 616, the application program 120 via the User Mode GDI Client 210 (or a different drawing system, for example, an XPS drawing system) draws a print image metafile. The metafile is drawn in accordance with the virtual device context parameters generated by the APS UI 202 passed to the application program 120 for the selected printer 114. Consequently, the image metafile is drawn to fit the virtual page provided by the APS Printer Driver 206, allowing prints of varying length to be printed on continuous feed media without media waste, and without defining a specific custom sheets size for each print image size.

In block 618, the application program 120 passes the metafile to the APS RIP 212. The RIP 212 converts the metafile to a printer specific language (i.e., RAW data) used by the printer 114 (e.g., PCL).

In block 620, the APS RIP 212 passes the RAW data to the Port Monitor 214 for delivery to the printer 114.

The above discussion is meant to be illustrative of the principles and various embodiments of the present invention. Numerous variations and modifications will become apparent to those skilled in the art once the above disclosure is fully appreciated. For example, while descriptions of exemplary embodiments refer to generating a metafile using GDI, those skilled in the art will recognize that drawing to a virtual page size as disclosed herein is applicable to any drawing system. It is intended that the following claims be interpreted to embrace all such variations and modifications.

What is claimed is:

1. A system, comprising:
a processor; and
a printing software system comprising an Active Printing System ("APS") configured to execute on the processor, the APS provides a display of capabilities of a printing device, the display comprising: a graphic representation of an image to be printed shown relative to a maximum printable width of a continuous feed media of unbounded length independent of and without selection or setup of a predefined page size.

2. The system of claim 1, wherein the APS is configured to cause the processor to scale the image to be printed such that the image is bounded only by the maximum printable width of the continuous feed media; and provide the scaled image as the graphic representation.

3. The system of claim 1, wherein the display provided by the APS comprises the printable width of the continuous feed media determined based only on the continuous feed media selected for printing the image.

4. The system of claim 1, wherein the wherein the processor is configured to scale the image for display based on a printable width dimension of the continuous feed media and unbounded length of the continuous feed media.

5. The system of claim 1, wherein the display provided by the APS comprises image scaling selection and an indication that a selected image scaling produces an image that is too large for a selected media; wherein the indication comprises rendering an overlarge dimension in a warning color.

6. The system of claim 1, wherein the display provided by the APS comprises a plurality of 90 degree image orientation selections.

7. The system of claim 1, wherein the plurality of different widths of continuous feed media are provided by the APS and not provided by a printer specific printer driver.

8. The system of claim 1 wherein the processor is configured to maintain unchanged a length dimension, as provided to the APS by an application, of the image independently of scaling applied to a width dimension of the image.

9. A method, comprising:
generating a display, via a processor, the display comprises a graphic representation of an image to be printed shown relative to a maximum printable width of a continuous feed media of unbounded length independent of and without selection or setup of a predefined page size; and
providing the display to a display device.

10. The method of claim 9, further comprising displaying the printable width of the continuous feed media as determined based only on the continuous feed media selected for printing the image.

11. The method of claim 9, further comprising displaying an image scaling selection and an indication that a selected image scaling produces an image that is too large for a selected media, wherein the indication comprises rendering an overlarge dimension in a warning color.

12. The method of claim 9, further comprising displaying a graphic representation of an image to be printed showing the appearance of the image on the continuous feed media.

13. The method of claim 9, further comprising displaying a plurality of 90 degree image orientation selections.

14. The method of claim 9, further comprising displaying a plurality of different widths of continuous feed media from which the continuous feed media on which the image is to be printed is selected.

15. A non-transitory computer-readable medium encoded with a computer program comprising:
- instructions that when executed cause a processor to generate a display that comprises a graphic representation of an image to be printed shown relative to printable width of a continuous feed media of unbounded length independent of and without selection or setup of a predefined page size; and
- instructions that when executed cause a processor to provide the display to a display device.

16. The computer-readable medium of claim 15, further comprising instructions that when executed cause a processor to display the printable width of the continuous feed media as determined based only on the continuous feed media selected for printing the image.

17. The computer-readable medium of claim 15, further comprising instructions that when executed cause a processor to display an image scaling selection and an indication that a selected image scaling produces an image that is too large for a selected media, wherein the indication comprises rendering an overlarge dimension in a warning color.

18. The computer-readable medium of claim 15, further comprising instructions that when executed cause a processor to display a graphic representation of an image to be printed showing the appearance of the image on the continuous feed media.

19. The computer-readable medium of claim 15, further comprising instructions that when executed cause a processor to display a plurality of selectable 90 degree orientations at which the image can be printed on a selected media.

20. The computer-readable medium of claim 15, further comprising instructions that when executed cause a processor to display a plurality of different widths of continuous feed media from which the continuous feed media on which the image is to be printed is selected.

* * * * *